(12) United States Patent  
Chen

(10) Patent No.: US 10,755,652 B2  
(45) Date of Patent: *Aug. 25, 2020

(54) LIQUID CRYSTAL DISPLAY DEVICE AND DRIVING METHOD THEREOF

(71) Applicants: HKC Corporation Limited, Shenzhen (CN); Chongqing HKC Optoelectronics Technology Co., ltd., Chongqing (CN)

(72) Inventor: Yu-Jen Chen, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/087,455

(22) PCT Filed: Dec. 16, 2017

(86) PCT No.: PCT/CN2017/116716  
§ 371 (c)(1),  
(2) Date: Sep. 21, 2018

(87) PCT Pub. No.: WO2018/121303  
PCT Pub. Date: Jul. 5, 2018

(65) Prior Publication Data  
US 2019/0086702 A1   Mar. 21, 2019

(30) Foreign Application Priority Data

Dec. 27, 2016   (CN) .......................... 2016 1 1227794

(51) Int. Cl.  
*G09G 3/36* (2006.01)  
*G02F 1/13357* (2006.01)  
(Continued)

(52) U.S. Cl.  
CPC ......... *G09G 3/3607* (2013.01); *G02F 1/1368* (2013.01); *G02F 1/13306* (2013.01);  
(Continued)

(58) Field of Classification Search  
CPC .. G09G 3/3607; G09G 3/3406; G09G 3/3614; G09G 3/3648; G09G 3/3666;  
(Continued)

(56) References Cited

U.S. PATENT DOCUMENTS

2003/0067436 A1* 4/2003 Hara .................... G09G 3/3406  
345/102  
2004/0090582 A1* 5/2004 Ikeda ................ G02F 1/133514  
349/130  
(Continued)

FOREIGN PATENT DOCUMENTS

CN   101131489 A   2/2008  
CN   101546537 A   9/2009  
(Continued)

*Primary Examiner* — Stephen G Sherman  
(74) *Attorney, Agent, or Firm* — WPAT, PC

(57) ABSTRACT

A liquid crystal display device includes a liquid crystal panel including a plurality of liquid crystal pixels, wherein the liquid crystal panel is configured to display a same picture in two adjacent frames; a driving module disposed on the non-display area, wherein the driving module is used to respectively provide each liquid crystal pixel with a same polarity pixel voltage of different levels in the two adjacent frames so as to deflect liquid crystal molecules of each liquid crystal pixel, and in each frame of the two adjacent frames, the level of the pixel voltage of each liquid crystal pixel is different from the level of the pixel voltage of the adjacent liquid crystal pixels in front, back, left or right.

18 Claims, 5 Drawing Sheets

(51) Int. Cl.
*G09G 3/34* (2006.01)
*G02F 1/1337* (2006.01)
*G02F 1/133* (2006.01)
*G02F 1/1333* (2006.01)
*G02F 1/1335* (2006.01)
*G02F 1/1368* (2006.01)
*G02F 1/1362* (2006.01)

(52) U.S. Cl.
CPC .. *G02F 1/133308* (2013.01); *G02F 1/133514* (2013.01); *G02F 1/133611* (2013.01); *G02F 1/133753* (2013.01); *G09G 3/3406* (2013.01); *G09G 3/3426* (2013.01); *G09G 3/367* (2013.01); *G09G 3/3611* (2013.01); *G09G 3/3614* (2013.01); *G09G 3/3648* (2013.01); *G09G 3/3666* (2013.01); *G09G 3/3677* (2013.01); *G02F 1/1362* (2013.01); *G02F 2001/133601* (2013.01); *G02F 2201/52* (2013.01); *G09G 2310/0254* (2013.01); *G09G 2320/0233* (2013.01); *G09G 2320/0242* (2013.01); *G09G 2320/0247* (2013.01); *G09G 2320/062* (2013.01); *G09G 2320/0626* (2013.01); *G09G 2320/0666* (2013.01); *G09G 2320/0686* (2013.01); *G09G 2340/16* (2013.01)

(58) Field of Classification Search
CPC ........... G09G 3/367; G09G 2320/0233; G09G 2320/0242; G09G 2320/0247; G09G 2320/0666; G09G 2320/0686; G02F 1/13306; G02F 1/133308; G02F 1/133514; G02F 1/133611; G02F 1/1368; G02F 2201/52
See application file for complete search history.

(56) References Cited

U.S. PATENT DOCUMENTS

| | | | |
|---|---|---|---|
| 2006/0181503 A1* | 8/2006 | Feng | G09G 3/342 345/102 |
| 2008/0136761 A1 | 6/2008 | Hong et al. | |
| 2009/0167659 A1* | 7/2009 | Kim | G09G 3/3655 345/89 |
| 2010/0020231 A1* | 1/2010 | Gong | G09G 3/20 348/445 |
| 2017/0162137 A1* | 6/2017 | Chen | G09G 3/36 |

FOREIGN PATENT DOCUMENTS

| | | |
|---|---|---|
| CN | 102298904 A | 12/2011 |
| CN | 103778897 A | 5/2014 |
| CN | 104821160 A | 8/2015 |
| CN | 106531106 A | 3/2017 |

* cited by examiner

LIQUID CRYSTAL DISPLAY DEVICE AND DRIVING METHOD THEREOF

FIELD OF THE DISCLOSURE

The disclosure relates to the field of liquid crystal display technologies, and more particularly to a liquid crystal display device and a driving method thereof.

BACKGROUND

With the evolution of optoelectronics and semiconductor technology, flat panel displays have also evolved. In many flat panel displays, liquid crystal displays have been applied to all aspects of production and life because of their advantages of high space utilization efficiency, low power consumption, no radiation and low electromagnetic interference.

The liquid crystal display generally includes a liquid crystal panel, a backlight module, and a driving module use for driving the liquid crystal panel and the backlight module. The liquid crystal panel includes a color filter substrate, an array substrate and a liquid crystal. The liquid crystal is sandwiched between the color filter substrate and array substrate. In a large-size liquid crystal panel, a negative-type VA (Vertically Aligned) liquid crystal is often used. However, the negative type VA liquid crystal has many defects. Especially when a large viewing angle is needed, the liquid crystal panel adopting the negative type VA liquid crystal will appear color shift phenomenon when viewed from a large viewing angle.

In order to solve the above defects, sub-pixels are often sub-divided into Main/Sub sub-pixels in the liquid crystal panel adopting the negative VA liquid crystal, and different pixel voltages are provided to Main/Sub sub-pixels. However, such pixel design often requires addition of metal wires and thin film transistors to drive the Main/Sub sub-pixels, resulting in the sacrifice of the aperture ratio and reducing light transmittance of the liquid crystal panel. In order to maintain the enough light transmittance, the luminance of the light emitted by the backlight module needs to be improved. Consequently, cost of the backlight module would be directly increased.

SUMMARY

On such basis, it is necessary to provide a liquid crystal display device which can improve color shifts without affecting the aperture ratio and a driving method thereof.

A liquid crystal display device includes a liquid crystal panel, including a liquid crystal panel, including a plurality of liquid crystal pixels and configured to display a same picture in two adjacent frames; a controlling circuit, including a driving module, used to respectively provide each liquid crystal pixel with a same polarity pixel voltage of different levels in the two adjacent frames so as to deflect liquid crystal molecules of each liquid crystal pixel, wherein in each frame of the two adjacent frames, the level of the pixel voltage of each liquid crystal pixel is different from the level of the pixel voltage of the adjacent liquid crystal pixels in front, back, left or right.

In one embodiment, the liquid crystal display device further includes a backlight module, the liquid crystal panel is divided into M×N rectangular panel partitions, the backlight module is divided into M×N rectangular backlight partitions, $1 \leq i \leq M$, $1 \leq j \leq N$, the rectangular panel partition of row i and column j corresponds to the rectangular backlight partition of row i and column j; in each frame of two adjacent frames, after the liquid crystal molecules of each liquid crystal pixel in each rectangular panel partition are deflected, the driving module is further configured to drive all the rectangular backlight partitions to emit light simultaneously.

In one embodiment, the liquid crystal display device further includes backlight module, the liquid crystal panel is divided into M×N rectangular panel partitions, the backlight module is divided into M×N rectangular backlight partitions, $1 \leq i \leq M$, $1 \leq j \leq N$, the rectangular panel partition of the i-th row and the j-th column corresponds to the rectangular backlight partition of the i-th row and the j-th column; in each frame of two adjacent frames, after the liquid crystal molecules of each liquid crystal pixel in the rectangular panel partition of the i-th row and the j-th column are deflected, the driving module is further configured to drive the rectangle backlight partition of the i-th row and the j-th column to emit light, till all the rectangular backlight partition are driven to emit light.

In one embodiment, sum of the pixel voltages of all the liquid crystal pixels in the rectangular panel partition of the i-th row and the j-th column and luminance of the rectangular backlight partition in the jth column of the i-th row satisfy the following formula 1.

$$L_{ij\_1} * V_{ij\_1} = L_{ij\_2} * V_{ij\_2} \qquad \text{[formula 1]}$$

Wherein $L_{ij\_1}$ represents the luminance of the rectangular backlight partition in the i-th row and j-th column in the previous frame of two adjacent frames, $V_{ij\_1}$ represents the sum of the pixel voltages of all the liquid crystal pixels in the rectangular panel partition of the i-th row and j-th column in the previous frame of the two adjacent frames, $L_{ij\_2}$ represents the luminance of the rectangular backlight partition of the i-th row and j-th column in the latter frame of two adjacent frames, $V_{ij\_2}$ represents the sum of the pixel voltages of all the liquid crystal pixels in the rectangular panel partition of the i-th row and j-th column in the latter frame of the two adjacent frames.

In one embodiment, the sum of the pixel voltages of all the liquid crystal pixels in the rectangular panel partition of the i-th row and the j-th column and luminance of the rectangular backlight partition in the jth column of the i-th row satisfy the following formula 1.

$$L_{ij\_1} * V_{ij\_1} = L_{ij\_2} * V_{ij\_2} \qquad \text{[formula 1]}$$

Wherein $L_{ij\_1}$ represents the luminance of the rectangular backlight partition in the i-th row and j-th column in the previous frame of two adjacent frames, $V_{ij\_1}$ represents the sum of the pixel voltages of all the liquid crystal pixels in the rectangular panel partition of the i-th row and j-th column in the previous frame of the two adjacent frames, $L_{ij\_2}$ represents the luminance of the rectangular backlight partition of the i-th row and j-th column in the latter frame of two adjacent frames, $V_{ij\_2}$ represents the sum of the pixel voltages of all the liquid crystal pixels in the rectangular panel partition of the i-th row and j-th column in the latter frame of the two adjacent frames.

In one embodiment, the sum of the pixel voltages of all the liquid crystal pixels in the rectangular panel partition of the i-th row and the j-th column and luminance of the rectangular backlight partition in the jth column of the i-th row satisfy the following formula 2.

$$L_{ij\_1} * V_{ij\_1} + L_{ij\_2} * V_{ij_2} = 2 * L_{ij} * V_{ij} \qquad \text{[formula 2]}$$

Wherein $L_{ij}$ represents the luminance of the rectangular backlight partition of the ith row and the jth column when the liquid crystal display is set to display the picture in only one frame, Vij represents the sum of the pixel voltages of all the liquid crystal pixels in the rectangular panel partition when the liquid crystal display is set to display the picture in only one frame, Lij_1 represents the luminance of the rectangular backlight partition in the i-th row and j-th column in the previous frame of two adjacent frames, Vij_1 represents the sum of the pixel voltages of all the liquid crystal pixels in the rectangular panel partition of the i-th row and j-th column in the previous frame of the two adjacent frames, Lij_2 represents the luminance of the rectangular backlight partition of the i-th row and j-th column in the latter frame of two adjacent frames, Vij_2 represents the sum of the pixel voltages of all the liquid crystal pixels in the rectangular panel partition of the i-th row and j-th column in the latter frame of the two adjacent frames.

In one embodiment, the sum of the pixel voltages of all the liquid crystal pixels in the rectangular panel partition of the i-th row and the j-th column and luminance of the rectangular backlight partition in the jth column of the i-th row satisfy the following formula 2.

$$Lij\_1*Vij\_1 + Lij\_2*Vij_2 = 2*Lij*Vij \qquad \text{[formula 2]}$$

Wherein Lij represents the luminance of the rectangular backlight partition of the ith row and the jth column when the liquid crystal display is set to display the picture in only one frame, Vij represents the sum of the pixel voltages of all the liquid crystal pixels in the rectangular panel partition when the liquid crystal display is set to display the picture in only one frame, Lij_1 represents the luminance of the rectangular backlight partition in the i-th row and j-th column in the previous frame of two adjacent frames, Vij_1 represents the sum of the pixel voltages of all the liquid crystal pixels in the rectangular panel partition of the i-th row and j-th column in the previous frame of the two adjacent frames, Lij_2 represents the luminance of the rectangular backlight partition of the i-th row and j-th column in the latter frame of two adjacent frames, Vij_2 represents the sum of the pixel voltages of all the liquid crystal pixels in the rectangular panel partition of the i-th row and j-th column in the latter frame of the two adjacent frames.

In one embodiment, the sum of the pixel voltages of all the liquid crystal pixels in the rectangular panel partition of the i-th row and the j-th column and luminance of the rectangular backlight partition in the jth column of the i-th row satisfy the following formula 2

$$Lij\_1*Vij\_1 + Lij\_2*Vij\_2 = 2*Lij*Vij \qquad \text{[formula 2]}$$

Wherein Lij represents the luminance of the rectangular backlight partition of the ith row and the jth column when the liquid crystal display is set to display the picture in only one frame, Vij represents the sum of the pixel voltages of all the liquid crystal pixels in the rectangular panel partition when the liquid crystal display is set to display the picture in only one frame In one embodiment, the controlling circuit further includes a communication circuit; a main control chip, electrically connected to the driving module through the communication circuit; a memory chip, electrically connected to the main control chip through the communication circuit and configured to store a first configuration parameter of the main control chip and a second configuration parameter of the driving module; wherein the main control chip is configured to read the first configuration parameter and the second configuration parameter from the memory chip, and send the second configuration parameter to the driving module.

In one embodiment, the pixel voltage of the liquid crystal pixel is proportional to the light transmittance of the liquid crystal pixel, a product of the light transmittance of the liquid crystal pixel and luminance of backlight is display brightness of the liquid crystal pixel.

In one embodiment, sum of the brightness of a same picture displayed in two adjacent frames of each rectangular panel partition of the liquid crystal panel is twice the brightness of the picture displayed in one frame of the liquid crystal panel without compensating for low color shift of viewing angle.

In one embodiment, the liquid crystal panel is a liquid crystal panel with a vertically aligned display mode.

A driving method of liquid crystal display device includes: in a previous frame of two adjacent frames, a driving module providing each liquid crystal pixel of a liquid crystal panel with a pixel voltage so as to deflect liquid crystal molecules of each liquid crystal pixel, and the liquid crystal panel being configured to display a same picture in two adjacent frames; in the latter frame of the two adjacent frames, the driving module providing each liquid crystal pixel of the liquid crystal panel with the pixel voltage so as to deflect liquid crystal molecules of each liquid crystal pixel; wherein, in the previous frame and the latter frame, the pixel voltage of each liquid crystal pixel is different from the level of the pixel voltage of the adjacent liquid crystal pixels in front, back, left or right, and the pixel voltages of the same liquid crystal pixel have the same polarity and different levels.

In the above display device, each liquid crystal pixel is provided with a same polarity pixel voltage of different levels in the two adjacent frames, and in each frame of the two adjacent frames, the level of the pixel voltage of each liquid crystal pixel is different from the level of the pixel voltage of the adjacent liquid crystal pixels in front, back, left or right. So that at the same time of displaying the same picture in two adjacent frames, the liquid crystal panel 10 can also achieve the effect of compensating for low color shift of viewing angle, and that is, the color shift phenomenon does not occur when the liquid crystal panel 10 is viewed from the large viewing angle. The liquid crystal pixel can not be used as a main/sub sub-pixel, it is not necessary to add the metal wiring and the thin film transistor to drive the main/sub sub-pixel, so that the aperture ratio would not be reduced. The product of the luminance of the rectangular backlight partition and the sum of the pixel voltages of all the liquid crystal pixels in the rectangular panel partition is equal, so that the display brightness of the rectangular panel partition in the previous frame and the latter frame of the two adjacent frames is the same, and thus the flickering phenomenon can be eliminated. The sum of the brightness of a same picture displayed in two adjacent frames of each rectangular panel partition of the liquid crystal panel can be twice the brightness of the picture displayed in one frame of the liquid crystal panel without compensating for low color shift of viewing angle, so that the brightness of the picture displayed by the liquid crystal panel can be the same as the brightness of the picture displayed by the liquid crystal panel without the compensation effect of low color shift of viewing angle.

BRIEF DESCRIPTION OF THE DRAWINGS

Accompanying drawings illustrated here are used for providing further understanding on the present disclosure, and form part of the present disclosure, and schematic embodiments and illustration thereof of the present disclosure are used for explaining the present application rather than improperly limiting the present disclosure.

DETAILED DESCRIPTION OF PREFERRED EMBODIMENTS

In order to explain the objects, technical solutions and advantages of the disclosure more clearly, the disclosure is further explained in detail in combination with drawings and embodiments. It should be understood that the specific embodiments described here are merely intended for explaining rather than limiting the disclosure.

Figure 1:
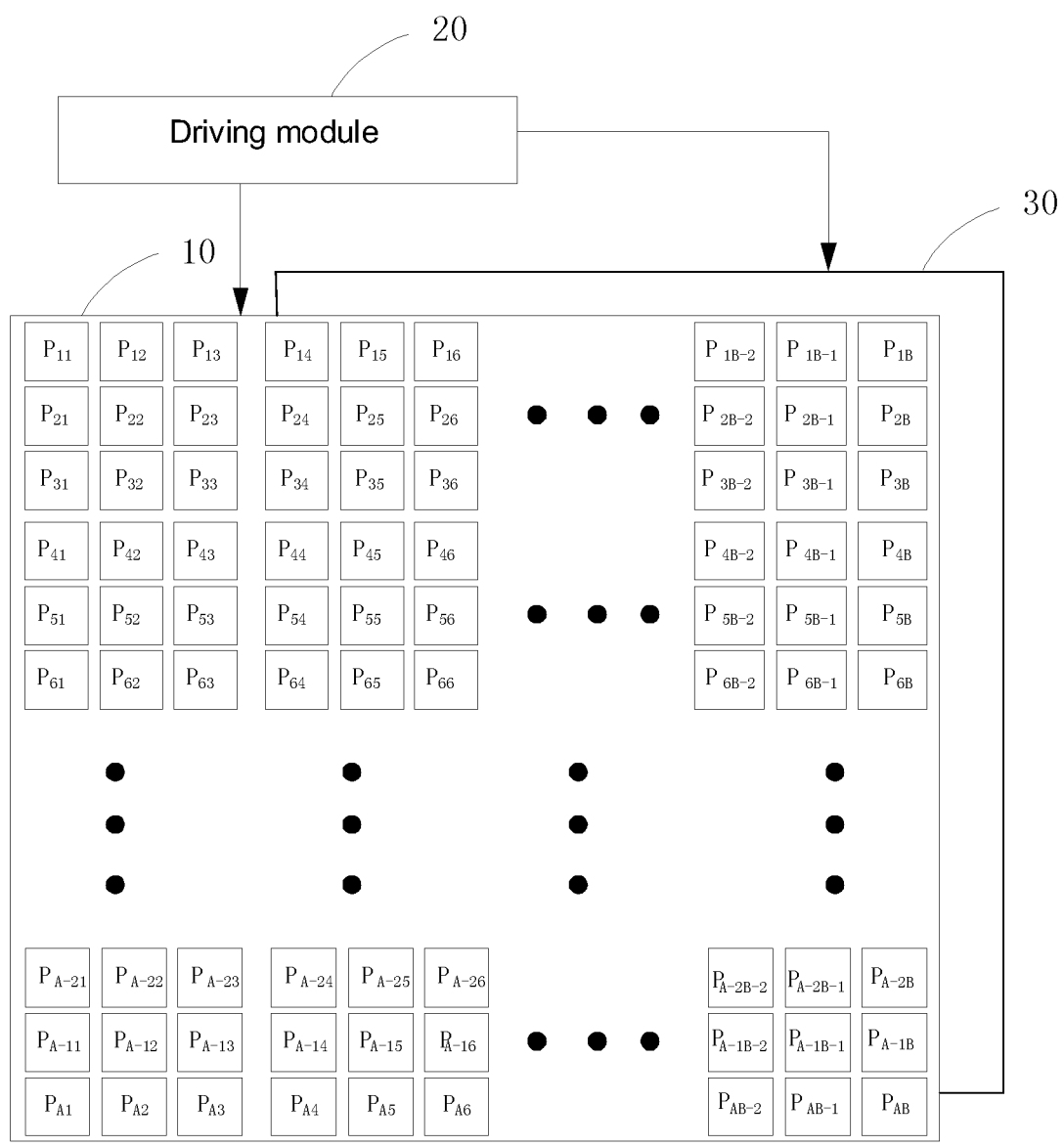
FIG. 1 is a schematic view of a liquid crystal display device in an embodiment according the present disclosure.

FIG. 1 is a schematic view of a liquid crystal display device in an embodiment according the present disclosure.

Referring to FIG. 1, the liquid crystal display device in an embodiment according the present disclosure includes a liquid crystal panel 10, a driving circuit board 40 and a backlight module 30.

The liquid crystal panel 10 includes a transistor array substrate, a color filter substrate and negative liquid crystal, the negative liquid crystal is sandwiched between the color filter substrate and the array substrate. In other words, the liquid crystal panel 10 can be a liquid crystal panel with a vertically aligned display mode. In addition, the transistor array substrate can be a thin film transistor array substrate.

In the process of assembling the liquid crystal display, the liquid crystal panel 10 and the backlight module 30 are arranged facing each other, and then are fixed together by a fixing structure such as a frame. The driving module 20 drives the backlight module 30 to emit light for providing to the liquid crystal panel 10. In FIG. 1, the assembled state of the liquid crystal panel 10 and the backlight module 30 is not shown for convenience of description of the embodiment.

The liquid crystal panel 10 includes A×B liquid crystal pixels (ie, subpixels) $P_{11}$, $P_{12}$, . . . , $P_{AB}$. The liquid crystal pixel $P_{ab}$ (wherein, 1≤a≤A, 1≤b≤B, and both a and b are integers) may be a red liquid crystal pixel, a green liquid crystal pixel, or a blue liquid crystal pixel. There are at least one red liquid crystal pixel, at least green liquid crystal pixel, and at least one blue liquid crystal pixel in the liquid crystal pixels $P_{11}$, $P_{12}$, . . . , $P_{AB}$. As a preferred embodiment, in the column direction, the liquid crystal pixels are the same color liquid crystal pixels, and in the row direction, the liquid crystal pixels are arranged sequentially with groups of the red liquid crystal pixel, the green liquid crystal pixel and the blue liquid crystal pixel.

In the liquid crystal panel 10 of this embodiment, each liquid crystal pixel is no longer subdivided into Main/Sub sub-pixels. In order to avoid color shift viewed the liquid crystal panel 10 from a large viewing angle, the present embodiment adopts the technical solutions as follows. The liquid crystal panel 10 is configured to display a same picture in two adjacent frames, and the driving module is used to respectively provide each liquid crystal pixel with a same polarity pixel voltage of different levels in the two adjacent frames so as to deflect liquid crystal molecules of each liquid crystal pixel, and in each frame of the two adjacent frames, the level of the pixel voltage of each liquid crystal pixel is different from the level of the pixel voltage of the adjacent liquid crystal pixels in front, back, left or right.

That is, the frame refresh rate of the liquid crystal panel 10 can be doubled. For example, the frame refresh rate of the liquid crystal panel 10 can be 120 HZ. For a specific method for improving the frame refresh rate, reference may be made to the related art, and details are not described herein.

The technical solution adopted in the above embodiment will be further elaborated below.

Referring to FIG. 1, in the previous frame of two adjacent frames, the driving module 20 provides a high pixel voltage (or a low pixel voltage) to the liquid crystal pixel $P_{ab}$ to deflect the liquid crystal molecules of the liquid crystal pixel $P_{ab}$. The driving module 20 provides a low pixel voltage (or a high pixel voltage) to drives the liquid crystal pixel $P_{(a-1)b}$, the liquid crystal pixel $P_{a(b-1)}$, the liquid crystal pixel $P_{a(b+1)}$, and the liquid crystal pixel $P_{(a+1)b}$.

In the latter frame of two adjacent frames, the driving module 20 provides a low pixel voltage (or a high pixel voltage) to the liquid crystal pixel $P_{ab}$ to deflect the liquid crystal molecules of the liquid crystal pixel $P_{ab}$. The driving module 20 provides a high pixel voltage (or a low pixel voltage) to drives the liquid crystal pixel $P_{(a-1)b}$, the liquid crystal pixel $P_{a(b-1)}$, the liquid crystal pixel $P_{a(b+1)}$, and the liquid crystal pixel $P_{(a+1)b}$.

That is the level of the pixel voltage of each liquid crystal pixel is different from the level of the pixel voltage of the adjacent liquid crystal pixels in front, back, left or right. And each of the liquid crystal pixels is provided with different levels of the pixel voltages in the two adjacent front and back frames. It should be noted that, the polarities of the high pixel voltage and the low pixel voltage are the same. In this way, the liquid crystal panel 10 can display the same picture in two adjacent frames.

In addition, the high pixel voltage and the low pixel voltage are determined in advance according to the input RGB signals and compensating for the required viewing angle effect, and are usually recorded in the driving module 10 by a look-up table (LUT). For example, taking an 8 bit driving signal as an example, each of the input RGB signals corresponds to 256 pairs of high and low pixel voltages, so there are 3*256 high pixel voltages and 3*256 low pixel voltages.

In the above liquid crystal display, each liquid crystal pixel is provided with a same polarity pixel voltage of different levels in the two adjacent frames, and in each frame of the two adjacent frames, the level of the pixel voltage of each liquid crystal pixel is different from the level of the pixel voltage of the adjacent liquid crystal pixels in front, back, left or right. So that at the same time of displaying the same picture in two adjacent frames, the liquid crystal panel 10 can also achieve the effect of compensating for low color shift of viewing angle, and that is, the color shift phenomenon does not occur when the liquid crystal panel 10 is viewed from the large viewing angle.

Figure 2:
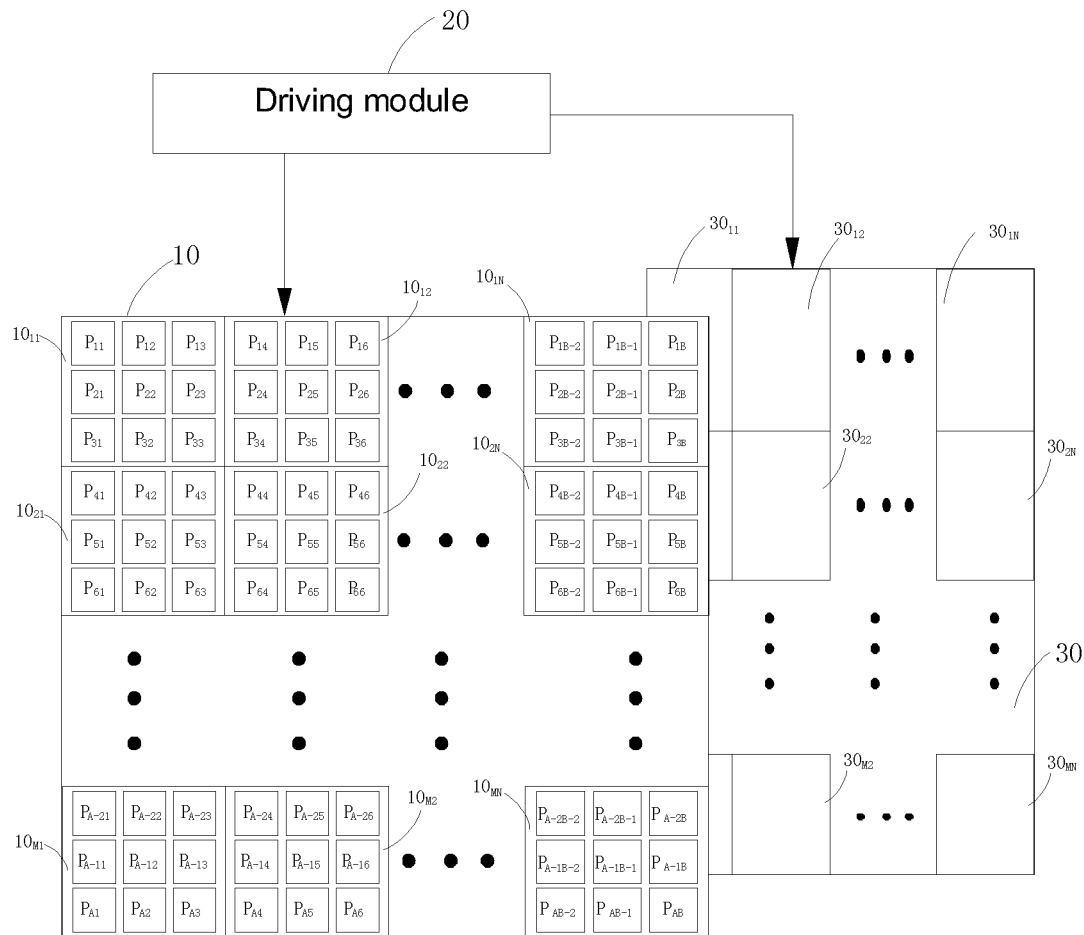
FIG. 2 is another schematic view of a liquid crystal display device in an embodiment according the present disclosure.

In order to overcome the flicker uncomfortable phenomenon caused by the uneven brightness of the liquid crystal pixels of the liquid crystal panel 10 in two adjacent frames, the backlight module 30 can further be divided the brightness regions. The brightness of each brightness region can be and dynamically adjusted, so that the display brightness of each liquid crystal pixel of the liquid crystal panel 10 is uniform, and the flickering phenomenon can be eliminated or reduced. Referring to FIG. 2, FIG. 2 is a schematic structural view of a liquid crystal display according to another embodiment of the present application. Only the differences between the embodiment shown in FIG. 2 and the embodiment shown in FIG. 1 will be described below.

Referring to FIG. 2, the liquid crystal panel 10 is divided into M×N rectangular panel partitions $10_{11}, 10_{12}, \ldots, 10_{MN}$, the backlight module 30 is divided into M×N rectangular backlight partitions $30_{11}, 30_{12}, \ldots, 30_{MN}$, the rectangular panel partition $10_{ij}$ corresponds to the rectangular backlight partition $30_{ij}$, 1≤i≤M, 1≤j≤N and Both i and j are integers. It should be noted that although the number of liquid crystal pixels included in the rectangular panel partition $10_{ij}$ is the same in the embodiment, it may be different as another embodiment.

The sum of the pixel voltages of all the liquid crystal pixels in the rectangular panel section $10_{ij}$ and the luminance of the rectangular backlight partition $30ij$ satisfy the following formula 1.

$$Lij\_1 * Vij\_1 = Lij\_2 * Vij\_2 \quad \text{[formula 1]}$$

Wherein Lij_1 represents the luminance of the rectangular backlight partition $30_{ij}$ in the previous frame of two adjacent frames, Vij_1 represents the sum of the pixel voltages of all the liquid crystal pixels in the rectangular panel partition $10_{ij}$ in the previous frame of the two adjacent frames, Lij_2 represents the luminance of the rectangular backlight partition $30_{ij}$ in the latter frame of two adjacent frames, Vij_2 represents the sum of the pixel voltages of all the liquid crystal pixels in the rectangular panel partition $100_{ij}$ in the latter frame of the two adjacent frames.

Since the pixel voltage of the liquid crystal pixel is proportional to the light transmittance of the liquid crystal pixel, the product of the light transmittance of the liquid crystal pixel and the luminance of the backlight is the display luminance of the liquid crystal pixel, that is, the product of the pixel voltage of the liquid crystal pixel and the luminance of the backlight can express the display brightness of the liquid crystal pixel. When the product of the luminance of the rectangular backlight partition $30_{ij}$ and the sum of the pixel voltages of all the liquid crystal pixels in the rectangular panel partition $10_{ij}$ is equal, the display brightness of the rectangular panel partition $10_{ij}$ in the two adjacent frames is the same, and thus the flickering phenomenon can be eliminated.

After the liquid crystal panel 10 and the backlight module 30 are divided into regions, providing display light to the liquid crystal panel 10 by the backlight module 30 may include the following two manners. Of course, the two manners described below are merely examples, and the present application may also include other suitable ways.

The first manner of the backlight module 30 providing the liquid crystal panel 10 with light is as follows. In each frame of two adjacent frames, after the liquid crystal molecules of all the liquid crystal pixels in all rectangular panel partitions $10_{11}, 10_{12}, \ldots, 10_{MN}$ are deflected, the driving module 20 drive all the rectangular backlight partitions $30_{11}, 30_{12}, \ldots, 30_{MN}$ to emit light simultaneously. It should be understood that the luminance of each rectangular backlight partition may be different or the same, and the luminance of each rectangular backlight partition can be respectively controlled by the driving module 20.

The second manner of the backlight module 30 providing the liquid crystal panel 10 with light is as follows. In each frame of two adjacent frames, after the liquid crystal molecules of the liquid crystal pixel in the rectangular panel partition $10_{ij}$ are deflected, the driving module 20 drives the rectangle backlight partition $30_{ij}$ to emit light, till all the rectangular backlight partition $30_{11}, 30_{12}, \ldots, 30_{MN}$ are driven to emit light. That is, the driving module 20 drives each of the rectangular backlight partitions in a time sharing manner. It should be understood that the luminance of each rectangular backlight partition may be different or the same, and the luminance of each rectangular backlight partition can be respectively controlled by the driving module 20.

In order to make the brightness of the picture displayed by the liquid crystal panel 10 the same as the brightness of the picture displayed by the liquid crystal panel without the compensation effect of low color shift of viewing angle, the sum of the brightness of a same picture displayed in two adjacent frames of each rectangular panel partition of the liquid crystal panel can be twice the brightness of the picture displayed in one frame of the liquid crystal panel without compensating for low color shift of viewing angle. Specific technical solutions are as follows.

The sum of the pixel voltages of all the liquid crystal pixels in the rectangular panel partition $10_{ij}$ and the luminance of the rectangular backlight partition $30_{ij}$ satisfy the following formula 2.

$$Lij\_1 * Vij\_1 + Lij\_2 * Vij\_2 = 2 * Lij * Vij \quad \text{[formula 2]}$$

Wherein, Lij represents the luminance of the corresponding rectangular backlight partition when the liquid crystal display without compensating for low color shift of viewing angle is set to display the picture in only one frame. Vij represents the sum of the pixel voltages of all the liquid crystal pixels in the corresponding rectangular panel partition when the liquid crystal display without compensating for low color shift of viewing angle is set to display the picture in only one frame. It should be noted that, the liquid crystal display without compensating for low color shift of viewing angle displays different pictures in different frames.

Figure 3:
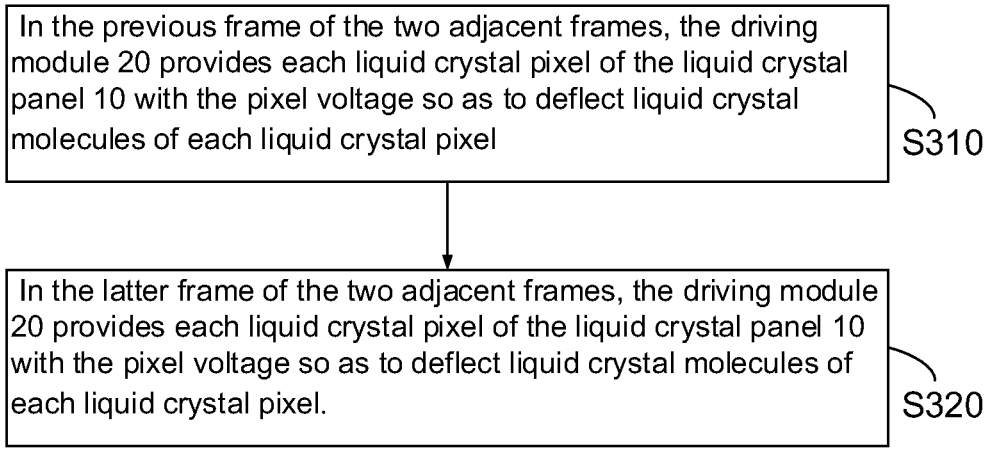
FIG. 3 is a flowchart of a method of driving the liquid crystal display device of FIG. 1.

The method of driving the liquid crystal display will be described below. FIG. 3 is a flowchart of a method of driving the liquid crystal display device of FIG. 1.

Referring to FIG. 1 and FIG. 3, the driving method of the liquid crystal display device according to the embodiment of the present application includes the following steps.

S310, in the previous frame of the two adjacent frames, the driving module 20 provides each liquid crystal pixel of the liquid crystal panel 10 with the pixel voltage so as to deflect liquid crystal molecules of each liquid crystal pixel.

S320, in the latter frame of the two adjacent frames, the driving module 20 provides each liquid crystal pixel of the liquid crystal panel 10 with the pixel voltage so as to deflect liquid crystal molecules of each liquid crystal pixel.

Wherein, in the previous frame and the latter frame, the pixel voltage of each liquid crystal pixel is different from the level of the pixel voltage of the adjacent liquid crystal pixels in front, back, left or right, and the pixel voltages of the same liquid crystal pixel have the same polarity and different levels.

Figure 4:
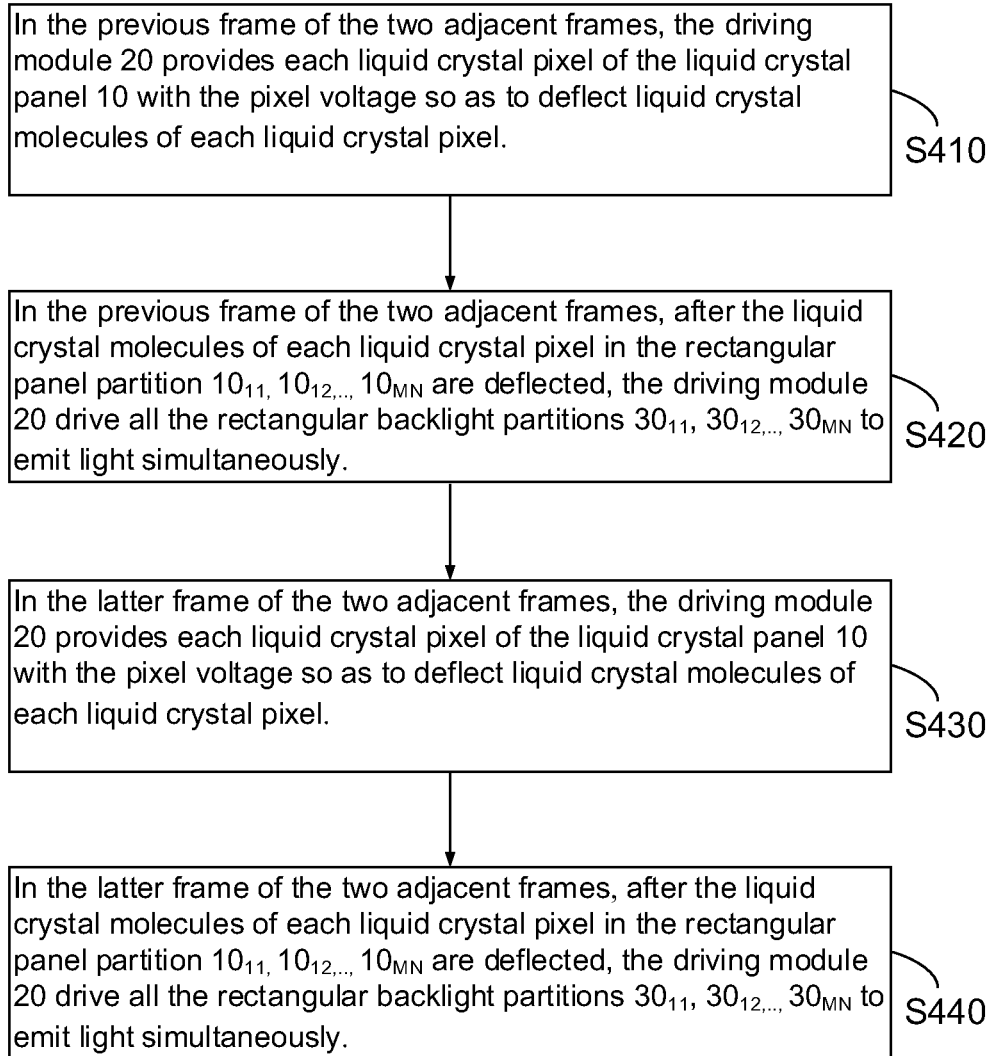
FIG. 4 is a flowchart of a method of driving the liquid crystal display device of FIG. 2.

FIG. 4 is a flowchart of a method of driving the liquid crystal display device of FIG. 2.

Referring to FIG. 2 and FIG. 4, the driving method of the liquid crystal display device according to the embodiment of the present application includes the following steps.

S410, in the previous frame of the two adjacent frames, the driving module 20 provides each liquid crystal pixel of the liquid crystal panel 10 with the pixel voltage so as to deflect liquid crystal molecules of each liquid crystal pixel.

S420, in the previous frame of the two adjacent frames, after the liquid crystal molecules of each liquid crystal pixel in the rectangular panel partition $10_{11}$, $10_{12}$, . . . , $10_{MN}$ are deflected, the driving module 20 drive all the rectangular backlight partitions $30_{11}$, $30_{12}$, . . . , $30_{MN}$ to emit light simultaneously.

S430, in the latter frame of the two adjacent frames, the driving module 20 provides each liquid crystal pixel of the liquid crystal panel 10 with the pixel voltage so as to deflect liquid crystal molecules of each liquid crystal pixel.

S440, in the latter frame of the two adjacent frames, after the liquid crystal molecules of each liquid crystal pixel in the rectangular panel partition $10_{11}$, $10_{12}$, . . . , $10_{MN}$ are deflected, the driving module 20 drive all the rectangular backlight partitions $30_{11}$, $30_{12}$, . . . , $30_{MN}$ to emit light simultaneously.

Wherein, in the previous frame and the latter frame, the pixel voltage of each liquid crystal pixel is different from the level of the pixel voltage of the adjacent liquid crystal pixels in front, back, left or right, and the pixel voltages of the same liquid crystal pixel have the same polarity and different levels.

Figure 5:
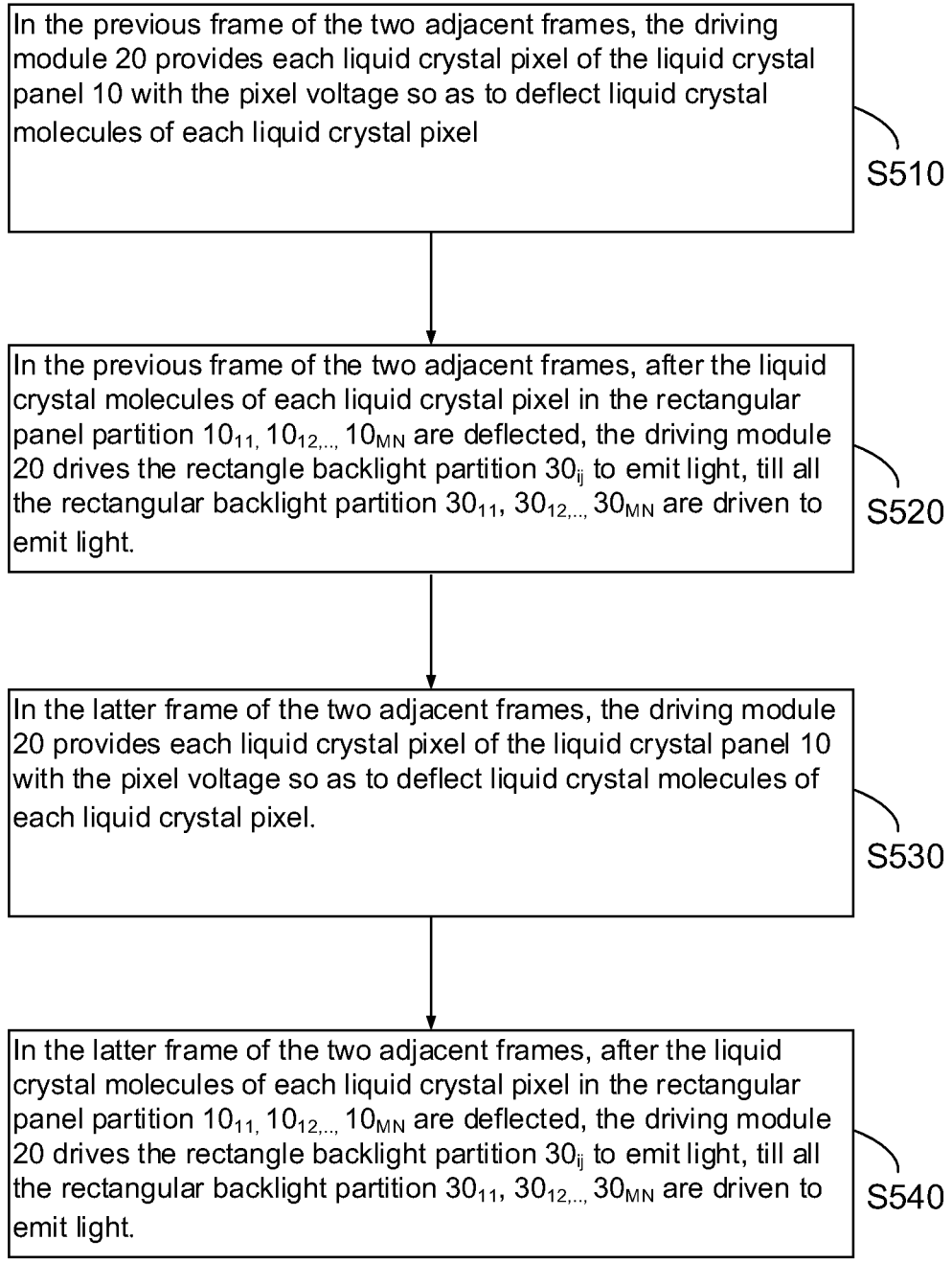
FIG. 5 is another flowchart of a method of driving the liquid crystal display device of FIG. 2.

FIG. 5 is another flowchart of a method of driving the liquid crystal display device of FIG. 2.

Referring to FIG. 2 and FIG. 5, the driving method of the liquid crystal display device according to the embodiment of the present application includes the following steps.

S510, in the previous frame of the two adjacent frames, the driving module 20 provides each liquid crystal pixel of the liquid crystal panel 10 with the pixel voltage so as to deflect liquid crystal molecules of each liquid crystal pixel.

S520, in the previous frame of the two adjacent frames, after the liquid crystal molecules of each liquid crystal pixel in the rectangular panel partition $10_{11}$, $10_{12}$, . . . , $10_{MN}$ are deflected, the driving module 20 drives the rectangle backlight partition $30_{ij}$ to emit light, till all the rectangular backlight partition $30_{11}$, $30_{12}$, . . . , $30_{MN}$ are driven to emit light.

S530, in the latter frame of the two adjacent frames, the driving module 20 provides each liquid crystal pixel of the liquid crystal panel 10 with the pixel voltage so as to deflect liquid crystal molecules of each liquid crystal pixel.

S540, in the latter frame of the two adjacent frames, after the liquid crystal molecules of each liquid crystal pixel in the rectangular panel partition $10_{11}$, $10_{12}$, . . . , $10_{MN}$ are deflected, the driving module 20 drives the rectangle backlight partition $30_{ij}$ to emit light, till all the rectangular backlight partition $30_{11}$, $30_{12}$, . . . , $30_{MN}$ are driven to emit light.

Wherein, in the previous frame and the latter frame, the pixel voltage of each liquid crystal pixel is different from the level of the pixel voltage of the adjacent liquid crystal pixels in front, back, left or right, and the pixel voltages of the same liquid crystal pixel have the same polarity and different levels.

Figure 6:
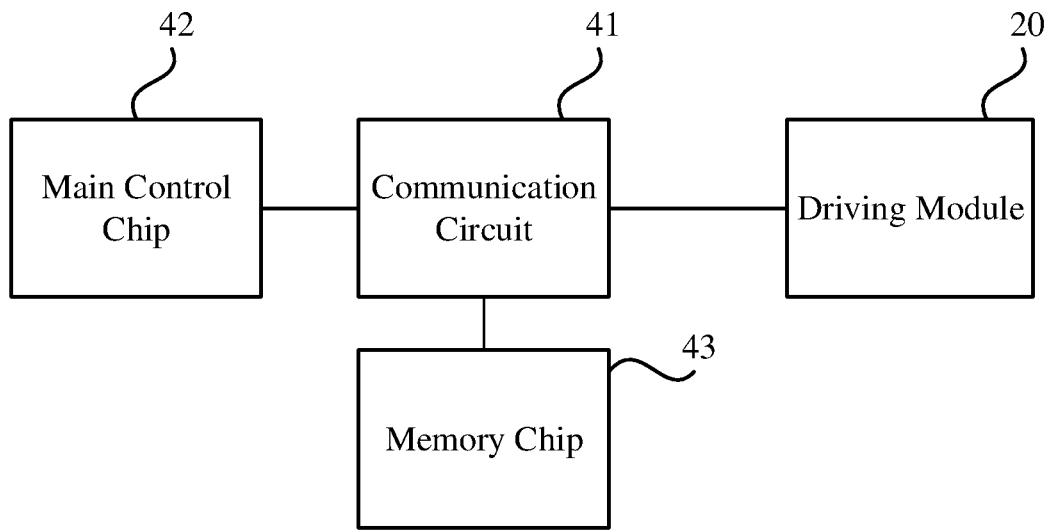
FIG. 6 is schematic view of a controlling circuit of the liquid crystal display device in another embodiment according the present disclosure.
Figure 7:
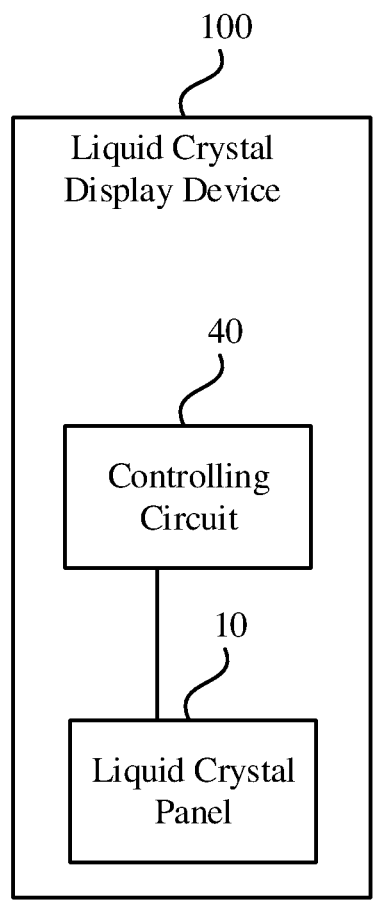
FIG. 7 is schematic view of a liquid crystal display device in another embodiment according the present disclosure.

Further, in the driving method shown in FIGS. 6 and 7, the sum of the pixel voltages of all the liquid crystal pixels in the rectangular panel partition $10ij$ and the luminance of the rectangle backlight partition $30_{ij}$ satisfy the above [formula 1] and/or [formula 2].

In summary, each liquid crystal pixel is provided with a same polarity pixel voltage of different levels in the two adjacent frames, and in each frame of the two adjacent frames, the level of the pixel voltage of each liquid crystal pixel is different from the level of the pixel voltage of the adjacent liquid crystal pixels in front, back, left or right. So that at the same time of displaying the same picture in two adjacent frames, the liquid crystal panel 10 can also achieve the effect of compensating for low color shift of viewing angle, and that is, the color shift phenomenon does not occur when the liquid crystal panel 10 is viewed from the large viewing angle. The liquid crystal pixel can not be used as a main/sub sub-pixel, it is not necessary to add the metal wiring and the thin film transistor to drive the main/sub sub-pixel, So that the aperture ratio would not be reduced. The product of the luminance of the rectangular backlight partition and the sum of the pixel voltages of all the liquid crystal pixels in the rectangular panel partition is equal, so that the display brightness of the rectangular panel partition in the previous frame and the latter frame of the two adjacent frames is the same, and thus the flickering phenomenon can be eliminated. The sum of the brightness of a same picture displayed in two adjacent frames of each rectangular panel partition of the liquid crystal panel can be twice the brightness of the picture displayed in one frame of the liquid crystal panel without compensating for low color shift of viewing angle, so that the brightness of the picture displayed by the liquid crystal panel can be the same as the brightness of the picture displayed by the liquid crystal panel without the compensation effect of low color shift of viewing angle.

In another embodiment, referring to FIG. 6 and FIG. 7, the liquid crystal display device 100 includes the liquid crystal panel 10 and a controlling circuit 40.

The controlling circuit 40 includes the driving module 20, a communication circuit 41, a main control chip 42 and a memory chip 43.

The main control chip 42 is electrically connected to the driving module 20 through the communication circuit 41. The memory chip 43 is electrically connected to the main control chip 42 through the communication circuit 41. The memory chip 43 is configured to store a first configuration parameter of the main control chip 42 and a second configuration parameter of the driving module 20. The main control chip 42 is configured to read the first configuration parameter and the second configuration parameter from the memory chip 43, and send the second configuration parameter to the driving module 20.

The liquid crystal display device 100 may be a display screen of an electronic device such as a television device, a smart phone or a tablet. The main control chip 42 is a core component of the liquid crystal display device 100. The main control chip 42 can control the operation of the liquid crystal display device 100. The main control chip 42 can coordinate and control the pictures required by other chips to be displayed on the display screen. The first configuration parameter may be a parameter required by the main control chip 42 to perform a system initialization process. The second configuration parameter may be an initialization parameter required for the driving module 20 to perform the screen display. The memory chip 43 may be a read only memory, a programmable ROM, an EPROM, a one-time programmable ROM, or the like.

Optionally, the memory chip 43 is a flash memory (FLASH) or a charged erasable programmable read-only memory (EEPROM).

Optionally, the communication circuit is a serial peripheral interface bus (SPI) or an integrated circuit bus (Inter-Integrated Circuit, I2C).

If the memory chip 43 is a flash memory, the serial peripheral interface bus may be used as the communication circuit. If the memory chip 43 is a charged erasable programmable read-only memory, the communication circuit may use an integrated circuit bus.

Finally, it should be noted that the above embodiments are merely illustrative of the technical solutions of the present disclosure and are not intended to be limiting thereof. For the person skilled in the art of the disclosure, without departing from the concept of the disclosure, simple deductions or substitutions can be made and should be included in the protection scope of the disclosure.

What is claimed is:

1. A liquid crystal display device, comprising:
   a liquid crystal panel, comprising a plurality of liquid crystal pixels and configured to display a same picture in two adjacent frames;
   a controlling circuit, comprising a driving module used to respectively provide each liquid crystal pixel with a same polarity pixel voltage of different levels in the two adjacent frames so as to deflect liquid crystal molecules of each liquid crystal pixel, wherein in each frame of the two adjacent frames, the level of the pixel voltage of each liquid crystal pixel is different from the level of the pixel voltage of the adjacent liquid crystal pixels in front, back, left or right;
   wherein the liquid crystal display device further comprises a backlight module, the liquid crystal panel is divided into M×N rectangular panel partitions, the backlight module is divided into M×N rectangular backlight partitions, 1≤i≤M, 1≤j≤N, the rectangular panel partition of row i and column j corresponds to the rectangular backlight partition of row i and column j, M, N, i and j are integers, and at least one of M and N is greater than 1;
   wherein the controlling circuit further comprises:
      a communication circuit;
      a main control chip, electrically connected to the driving module through the communication circuit; and
      a memory chip, electrically connected to the main control chip through the communication circuit and configured to store a first configuration parameter of the main control chip and a second configuration parameter of the driving module;
   wherein the main control chip is configured to read the first configuration parameter and the second configuration parameter from the memory chip, and send the second configuration parameter to the driving module.

2. The liquid crystal display device according to claim 1, wherein in each frame of two adjacent frames, after the liquid crystal molecules of each liquid crystal pixel in each rectangular panel partition are deflected, the driving module is further configured to drive all the rectangular backlight partitions to emit light simultaneously.

3. The liquid crystal display device according to claim 2, wherein sum of the pixel voltages of all the liquid crystal pixels in the rectangular panel partition of the i-th row and the j-th column and luminance of the rectangular backlight partition in the jth column of the i-th row satisfy the following formula 1, $$Lij\_1 * Vij\_1 = Lij\_2 * Vij\_2 \qquad \text{[formula 1]}$$

wherein Lij_1 represents the luminance of the rectangular backlight partition in the i-th row and j-th column in the previous frame of two adjacent frames, Vij_1 represents the sum of the pixel voltages of all the liquid crystal pixels in the rectangular panel partition of the i-th row and j-th column in the previous frame of the two adjacent frames, Lij_2 represents the luminance of the rectangular backlight partition of the i-th row and j-th column in the latter frame of two adjacent frames, Vij_2 represents the sum of the pixel voltages of all the liquid crystal pixels in the rectangular panel partition of the i-th row and j-th column in the latter frame of the two adjacent frames.

4. The liquid crystal display device according to claim 3, wherein the sum of the pixel voltages of all the liquid crystal pixels in the rectangular panel partition of the i-th row and the j-th column and luminance of the rectangular backlight partition in the jth column of the i-th row satisfy the following formula 2, $$Lij\_1 * Vij\_1 + Lij\_2 * Vij_2 = 2 * Lij * Vij \qquad \text{[formula 2]}$$

wherein Lij represents the luminance of the rectangular backlight partition of the ith row and the jth column when the liquid crystal display is set to display the picture in only one frame, Vij represents the sum of the pixel voltages of all the liquid crystal pixels in the rectangular panel partition when the liquid crystal display is set to display the picture in only one frame.

5. The liquid crystal display device according to claim 2, wherein the sum of the pixel voltages of all the liquid crystal pixels in the rectangular panel partition of the i-th row and the j-th column and luminance of the rectangular backlight partition in the jth column of the i-th row satisfy the following formula 2, $$Lij\_1 * Vij\_1 + Lij\_2 * Vij_2 = 2 * Lij * Vij \qquad \text{[formula 2]}$$

wherein Lij represents the luminance of the rectangular backlight partition of the ith row and the jth column when the liquid crystal display is set to display the picture in only one frame, Vij represents the sum of the pixel voltages of all the liquid crystal pixels in the rectangular panel partition when the liquid crystal display is set to display the picture in only one frame, Lij_1 represents the luminance of the rectangular backlight partition in the i-th row and j-th column in the previous frame of two adjacent frames, Vij_1 represents the sum of the pixel voltages of all the liquid crystal pixels in the rectangular panel partition of the i-th row and j-th column in the previous frame of the two adjacent frames, Lij_2 represents the luminance of the rectangular backlight partition of the i-th row and j-th column in the latter frame of two adjacent frames, Vij_2 represents the sum of the pixel voltages of all the liquid crystal pixels in the rectangular panel partition of the i-th row and j-th column in the latter frame of the two adjacent frames.

6. The liquid crystal display device according to claim 1, wherein in each frame of two adjacent frames, after the liquid crystal molecules of each liquid crystal pixel in the rectangular panel partition of the i-th row and the j-th column are deflected, the driving module is further configured to drive the rectangle backlight partition of the i-th row and the j-th column to emit light, till all the rectangular backlight partition are driven to emit light.

7. The liquid crystal display device according to claim 6, wherein the sum of the pixel voltages of all the liquid crystal pixels in the rectangular panel partition of the i-th row and the j-th column and luminance of the rectangular backlight partition in the jth column of the i-th row satisfy the following formula 1, $$Lij\_1 * Vij\_1 = Lij\_2 * Vij\_2 \qquad \text{[formula 1]}$$

wherein Lij_1 represents the luminance of the rectangular backlight partition in the i-th row and j-th column in the previous frame of two adjacent frames, Vij_1 represents the sum of the pixel voltages of all the liquid crystal pixels in the rectangular panel partition of the i-th row and j-th column in the previous frame of the two adjacent frames, Lij_2 represents the luminance of the rectangular backlight partition of the i-th row and j-th column in the latter frame of two adjacent frames, Vij_2 represents the sum of the pixel voltages of all the liquid crystal pixels in the rectangular panel partition of the i-th row and j-th column in the latter frame of the two adjacent frames.

8. The liquid crystal display device according to claim 7, wherein the sum of the pixel voltages of all the liquid crystal pixels in the rectangular panel partition of the i-th row and the j-th column and luminance of the rectangular backlight partition in the jth column of the i-th row satisfy the following formula 2, $$Lij\_1*Vij\_1+Lij\_2*Vij_2=2*Lij*Vij \quad \text{[formula 2]}$$

wherein Lij represents the luminance of the rectangular backlight partition of the ith row and the jth column when the liquid crystal display is set to display the picture in only one frame, Vij represents the sum of the pixel voltages of all the liquid crystal pixels in the rectangular panel partition when the liquid crystal display is set to display the picture in only one frame.

9. The liquid crystal display device according to claim 6, wherein the sum of the pixel voltages of all the liquid crystal pixels in the rectangular panel partition of the i-th row and the j-th column and luminance of the rectangular backlight partition in the jth column of the i-th row satisfy the following formula 2, $$Lij\_1*Vij\_1+Lij\_2*Vij_2=2*Lij*Vij \quad \text{[formula 2]}$$

wherein Lij represents the luminance of the rectangular backlight partition of the ith row and the jth column when the liquid crystal display is set to display the picture in only one frame, Vij represents the sum of the pixel voltages of all the liquid crystal pixels in the rectangular panel partition when the liquid crystal display is set to display the picture in only one frame, Lij_1 represents the luminance of the rectangular backlight partition in the i-th row and j-th column in the previous frame of two adjacent frames, Vij_1 represents the sum of the pixel voltages of all the liquid crystal pixels in the rectangular panel partition of the i-th row and j-th column in the previous frame of the two adjacent frames, Lij_2 represents the luminance of the rectangular backlight partition of the i-th row and j-th column in the latter frame of two adjacent frames, Vij_2 represents the sum of the pixel voltages of all the liquid crystal pixels in the rectangular panel partition of the i-th row and j-th column in the latter frame of the two adjacent frames.

10. The liquid crystal display device according to claim 1, wherein the pixel voltage of the liquid crystal pixel is proportional to the light transmittance of the liquid crystal pixel, a product of the light transmittance of the liquid crystal pixel and luminance of backlight is display brightness of the liquid crystal pixel.

11. The liquid crystal display device according to claim 1, wherein sum of the brightness of a same picture displayed in two adjacent frames of each of the M×N rectangular panel partitions of the liquid crystal panel is twice the brightness of the picture displayed in one frame of the liquid crystal panel without compensating for low color shift of viewing angle.

12. The liquid crystal display device according to claim 1, wherein the liquid crystal panel is a liquid crystal panel with a vertically aligned display mode.

13. A driving method of liquid crystal display device, comprising:
in a previous frame of two adjacent frames, a driving module providing each liquid crystal pixel of a liquid crystal panel with a pixel voltage so as to deflect liquid crystal molecules of each liquid crystal pixel, and the liquid crystal panel being configured to display a same picture in two adjacent frames;
in the latter frame of the two adjacent frames, the driving module providing each liquid crystal pixel of the liquid crystal panel with the pixel voltage so as to deflect liquid crystal molecules of each liquid crystal pixel;
wherein, in the previous frame and the latter frame, the pixel voltage of each liquid crystal pixel is different from the level of the pixel voltage of the adjacent liquid crystal pixels in front, back, left or right, and the pixel voltages of the same liquid crystal pixel have the same polarity and different levels;
the liquid crystal display device further comprises a backlight module, the liquid crystal panel is divided into M×N rectangular panel partitions, the backlight module is divided into M×N rectangular backlight partitions, $1 \leq i \leq M$, $1 \leq j \leq N$, the rectangular panel partition of row i and column j corresponds to the rectangular backlight partition of row i and column j, M, N, i and j are integers, and at least one of M and N is greater than 1;
wherein the driving method of liquid crystal display device further comprises:
in the previous frame of the two adjacent frames, after the liquid crystal molecules of each liquid crystal pixel in each of the M×N rectangular panel partitions are deflected, the driving module is further configured to drive all the M×N rectangular backlight partitions to emit light simultaneously;
in the latter frame of the two adjacent frames, after the liquid crystal molecules of each liquid crystal pixel in each of the M×N rectangular panel partitions are deflected, the driving module is further configured to drive all the M×N rectangular backlight partitions to emit light simultaneously.

14. The driving method of liquid crystal display device according to claim 13, wherein sum of the pixel voltages of all the liquid crystal pixels in the rectangular panel partition of the i-th row and the j-th column and luminance of the rectangular backlight partition in the jth column of the i-th row satisfy the following formula 1 and/or formula 2, $$Lij\_1*Vij\_1=Lij\_2*Vij\_2 \quad \text{[formula 1]}$$

$$Lij\_1*Vij\_1+Lij\_2*Vij_2=2*Lij*Vij \quad \text{[formula 2]}$$

wherein Lij_1 represents the luminance of the rectangular backlight partition in the i-th row and j-th column in the previous frame of two adjacent frames, Vij_1 represents the sum of the pixel voltages of all the liquid crystal pixels in the rectangular panel partition of the i-th row and j-th column in the previous frame of the two adjacent frames, Lij_2 represents the luminance of the rectangular backlight partition of the i-th row and j-th column in the latter frame of two adjacent frames, Vij_2 represents the sum of the pixel voltages of all the liquid crystal pixels in the rectangular panel partition of the i-th row and j-th column in the latter frame of the two adjacent frames, Lij represents the luminance of the rectangular backlight partition of the ith row and the jth column when the liquid crystal display is set to display the picture in only one frame, Vij represents the sum of the pixel voltages of all the liquid crystal pixels in the rectangular panel partition when the liquid crystal display is set to display the picture in only one frame.

15. The driving method of liquid crystal display device according to claim 13, wherein the pixel voltage of the liquid crystal pixel is proportional to the light transmittance of the liquid crystal pixel, a product of the light transmittance of the liquid crystal pixel and luminance of backlight is display brightness of the liquid crystal pixel.

16. The driving method of liquid crystal display device according to claim 13, wherein the liquid crystal panel is a liquid crystal panel with a vertically aligned display mode.

17. A driving method of liquid crystal display device, comprising:
  in a previous frame of two adjacent frames, a driving module providing each liquid crystal pixel of a liquid crystal panel with a pixel voltage so as to deflect liquid crystal molecules of each liquid crystal pixel, and the liquid crystal panel being configured to display a same picture in two adjacent frames;
  in the latter frame of the two adjacent frames, the driving module providing each liquid crystal pixel of the liquid crystal panel with the pixel voltage so as to deflect liquid crystal molecules of each liquid crystal pixel;
  wherein, in the previous frame and the latter frame, the pixel voltage of each liquid crystal pixel is different from the level of the pixel voltage of the adjacent liquid crystal pixels in front, back, left or right, and the pixel voltages of the same liquid crystal pixel have the same polarity and different levels;
  the liquid crystal display device further comprises a backlight module, the liquid crystal panel is divided into M×N rectangular panel partitions, the backlight module is divided into M×N rectangular backlight partitions, $1 \leq i \leq M$, $1 \leq j \leq N$, the rectangular panel partition of row i and column j corresponds to the rectangular backlight partition of row i and column j, M, N, i and j are integers, and at least one of M and N is greater than 1;
  wherein the driving method of liquid crystal display device further comprises:
    in the previous frame of the two adjacent frames, after the liquid crystal molecules of each liquid crystal pixel in the rectangular panel partition of the i-th row and the j-th column are deflected, the driving module is further configured to drive the rectangle backlight partition of the i-th row and the j-th column to emit light, till all the rectangular backlight partition are driven to emit light;
    in the latter frame of the two adjacent frames, after the liquid crystal molecules of each liquid crystal pixel in the rectangular panel partition of the i-th row and the j-th column are deflected, the driving module is further configured to drive the rectangle backlight partition of the i-th row and the j-th column to emit light, till all the rectangular backlight partition are driven to emit light.

18. The driving method of liquid crystal display device according to claim 17, wherein sum of the pixel voltages of all the liquid crystal pixels in the rectangular panel partition of the i-th row and the j-th column and luminance of the rectangular backlight partition in the jth column of the i-th row satisfy the following formula 1 and/or formula 2, $$Lij\_1 * Vij\_1 = Lij\_2 * Vij\_2 \quad \text{[formula 1]}$$

$$Lij\_1 * Vij\_1 + Lij\_2 * Vij_2 = 2 * Lij * Vij \quad \text{[formula 2]}$$

wherein Lij_1 represents the luminance of the rectangular backlight partition in the i-th row and j-th column in the previous frame of two adjacent frames, Vij_1 represents the sum of the pixel voltages of all the liquid crystal pixels in the rectangular panel partition of the i-th row and j-th column in the previous frame of the two adjacent frames, Lij_2 represents the luminance of the rectangular backlight partition of the i-th row and j-th column in the latter frame of two adjacent frames, Vij_2 represents the sum of the pixel voltages of all the liquid crystal pixels in the rectangular panel partition of the i-th row and j-th column in the latter frame of the two adjacent frames, Lij represents the luminance of the rectangular backlight partition of the ith row and the jth column when the liquid crystal display is set to display the picture in only one frame, Vij represents the sum of the pixel voltages of all the liquid crystal pixels in the rectangular panel partition when the liquid crystal display is set to display the picture in only one frame.

* * * * *